United States Patent
Hikichi

(10) Patent No.: US 11,451,684 B2
(45) Date of Patent: Sep. 20, 2022

(54) PROCESSOR HAVING A PLURALITY OF CORES AND A CONTROLLER THAT SWITCHES POWER STATES BASED ON CORES STATE

(71) Applicant: CANON KABUSHIKI KAISHA, Tokyo (JP)

(72) Inventor: Atsushi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/906,958

(22) Filed: Jun. 19, 2020

(65) Prior Publication Data

US 2020/0412900 A1  Dec. 31, 2020

(30) Foreign Application Priority Data

Jun. 27, 2019 (JP) .............................. JP2019-120581

(51) Int. Cl.
- *H04N 1/00* (2006.01)
- *G06F 1/3228* (2019.01)
- *G06F 1/324* (2019.01)

(52) U.S. Cl.
CPC ......... *H04N 1/00904* (2013.01); *G06F 1/324* (2013.01); *G06F 1/3228* (2013.01); *H04N 1/00896* (2013.01)

(58) Field of Classification Search
None
See application file for complete search history.

(56) References Cited

U.S. PATENT DOCUMENTS

| | | | | |
|---|---|---|---|---|
| 2011/0173477 A1* | 7/2011 | Asaba | ................... | G06F 1/3287 713/323 |
| 2016/0170474 A1* | 6/2016 | Takemura | ............. | G06F 9/5094 713/324 |
| 2016/0378164 A1* | 12/2016 | Tsuji | .................... | G06F 9/4881 718/107 |
| 2017/0212580 A1* | 7/2017 | Tsuji | .................... | G06F 1/3203 |

FOREIGN PATENT DOCUMENTS

| JP | 2009-169871 A | 7/2009 |
|---|---|---|
| JP | 2017-16219 A | 1/2017 |

\* cited by examiner

*Primary Examiner* — Dov Popovici
(74) *Attorney, Agent, or Firm* — Canon U.S.A., Inc. IP Division

(57) ABSTRACT

An apparatus includes a control unit that switches a power state between first and second power states, the first power state being a state where one of a plurality of cores is usable and the other cores are unusable, the second power state being a state where the plurality of cores is unusable. Based on reception of the predetermined signal in a case where the apparatus is in the second power state, the control unit causes the apparatus to transition from the second power state to the first power state, and under a first condition to be met after the transition to the first power state in a case where the apparatus is in the first power state, the control unit causes the apparatus to transition from the first power state to the second power state.

26 Claims, 9 Drawing Sheets

PROCESSOR HAVING A PLURALITY OF CORES AND A CONTROLLER THAT SWITCHES POWER STATES BASED ON CORES STATE

BACKGROUND OF THE INVENTION

Field of the Invention

The aspect of the embodiments relates to an apparatus and a method thereof.

Description of the Related Art

Recent image forming apparatuses use a multi-core central processing unit (CPU) to cope with improvements in operating frequencies of a CPU and peripheral devices and an increase in the number of CPU cores (many cores such as two, four, or eight cores). According to this configuration, even when a plurality of jobs is running in conflict with each other, high performance can be realized by returning a response in a realistic period of time.

If an image forming apparatus has not been accessed for a predetermined time period, the image forming apparatus performs suspend processing so that each core of a CPU can transition to a power saving state, which is a sleep state. On the contrary, upon receiving a notification indicating a restoration event in the sleep state, the image forming apparatus performs resume processing to restore each core of the CPU from the sleep state, to thereby restore the image forming apparatus to a standby state.

When suspend/resume processing is performed, the CPU performs processing, such as write processing for writing a cache of the CPU to a memory, for each core, as post processing for the cache which is a temporary data holding area for the CPU. In a case where the CPU receives an interrupt signal during the post processing for the cache, the CPU cannot recognize the interrupt signal in some cases.

Japanese Patent Application Laid-Open No. 2017-16219 discusses an electronic apparatus having a configuration in which a CPU includes a core 0 and a core 1. According to the configuration discussed in Japanese Patent Application Laid-Open No. 2017-16219, in a case where the total number of tasks of a first core is less than a first threshold and the total number of tasks of a second core does not exceed a second threshold, the first core in which the total number of tasks is less than the first threshold is caused to transition to a sleep state and the second core is caused to execute the tasks that were supposed to be executed by the first core. Further, in a case where only the second core executes processing while the first core is in the sleep state and the total number of tasks exceeds a third threshold, the first core in the sleep state is restored from the sleep state to continue processing using the two cores.

SUMMARY OF THE INVENTION

According to an aspect of the embodiments, an apparatus that includes a processor including a plurality of cores includes a reception unit configured to receive a predetermined signal, and a control unit configured to switch a power state between a first power state and a second power state, the first power state being a state where one of the plurality of cores is usable and the other cores are unusable, the second power state being a state where the plurality of cores is unusable. Based on reception of the predetermined signal in a case where the apparatus is in the second power state, the control unit causes the apparatus to transition from the second power state to the first power state, and under a first condition to be met after the transition to the first power state in a case where the apparatus is in the first power state, the control unit causes the apparatus to transition from the first power state to the second power state.

Further features of the disclosure will become apparent from the following description of exemplary embodiments with reference to the attached drawings.

DESCRIPTION OF THE EMBODIMENTS

Figure 1:
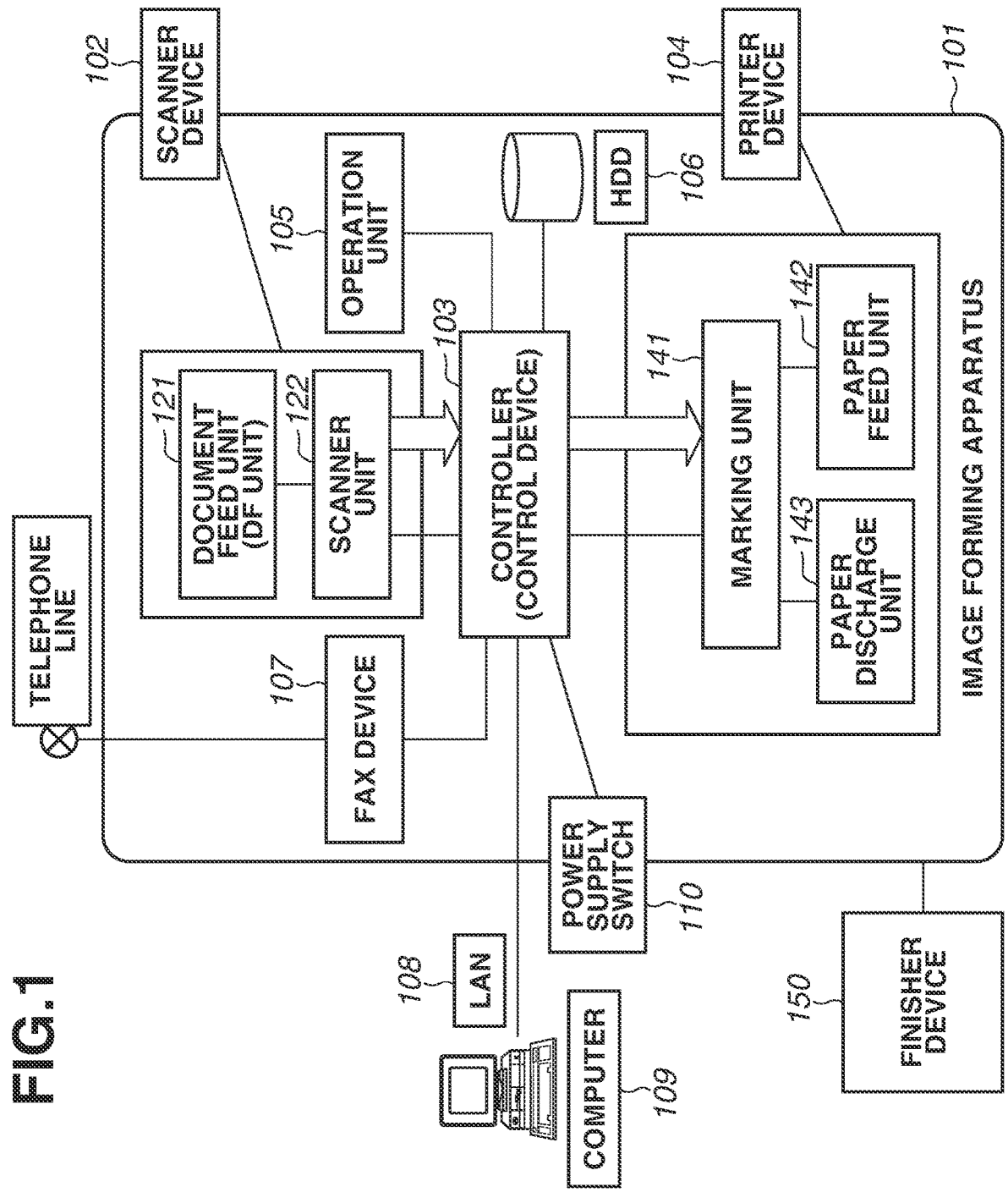
FIG. 1 is a block diagram illustrating a configuration of an image forming system.

A first exemplary embodiment will be described. FIG. 1 is a block diagram illustrating a configuration of an image forming system. The first exemplary embodiment illustrates an image forming apparatus including a print function, a scanner function, a data communication function, and the like, i.e., a multi-function peripheral (MFP), as an example of an information processing apparatus according to the present exemplary embodiment.

Referring to FIG. 1, an image forming apparatus 101 is communicably connected to a computer 109, such as a personal computer (PC), via a local area network (LAN) 108. For example, the image forming apparatus 101 receives a job from the computer 109 via the LAN 108. In the image forming system illustrated in FIG. 1, a plurality of computers may be connected to the LAN 108.

A controller 103 is connected to modules such as a scanner device 102, a printer device 104, an operation unit 105, a hard disk drive (HDD) 106, and a facsimile (FAX) device 107. The controller 103 controls each module to execute jobs (such as a print job and a scan job) corresponding to the respective functions of the image forming apparatus 101. The image forming apparatus 101 is capable of not only receiving image data from the computer 109 via the LAN 108, but also, for example, making settings for jobs issued by the computer 109 and making settings for devices.

The HDD 106 stores image data, various programs, and the like. The various programs include programs for executing operations according to the following exemplary embodiments.

The FAX device 107 transmits and receives image data and the like via a telephone line or the like. The FAX device 107 includes a reception interface (IF) (not illustrated) for receiving data, and a data processing unit (not illustrated) for processing the received data.

The scanner device 102 includes a document feed unit 121 and a scanner unit 122. The document feed unit 121 is capable of continuously feeding a document bundle to an image reading position. The scanner unit 122 optically reads an image on a sheet at a reading position on a platen glass and converts the read image into image data. The image data obtained by the scanner unit 122 is transmitted to the controller 103. The image forming apparatus 101 includes an image storing function for storing image data read by the scanner device 102 in the HDD 106, and performing image transmission or image printing, as needed. The image forming apparatus 101 also includes an image transmission function for transmitting image data read by the scanner device 102 to the computer 109 via the LAN 108.

The printer device 104 includes a paper feed unit 142, a marking unit 141, and a paper discharge unit 143. The paper feed unit 142 is capable of sequentially feeding paper from a loaded sheet bundle. The marking unit 141 is used to print an image on each of the fed sheets. The paper discharge unit 143 is used to discharge the printed sheets to the outside of the image forming apparatus 101. The image forming apparatus 101 also includes an image printing function for analyzing, for example, a page description language (PDL), which is transmitted from the computer 109, and performing printing on a sheet by the printer device 104 based on the analysis result. The image forming apparatus 101 also includes a copying function for storing image data read by the scanner device 102 in the HDD 106, and performing printing on a sheet by the printer device 104.

The operation unit 105 receives a user setting operation on the image forming apparatus 101. The operation unit 105 includes, for example, a screen, a power saving button, a copy button, a cancel button, a reset button, a numeric keypad, and a user mode key. Examples of the screen may include a touch panel and a normal screen.

The image forming apparatus 101 is connectable to a finisher device 150. The finisher device 150 executes a finishing process, such as sorting, stapling, punching, or cutting, on the sheets output from the paper discharge unit 143 of the printer device 104 in the image forming apparatus 101.

A power supply switch 110 is connected to the controller 103. When the power supply switch 110 is in an ON state, power is fed to a power supply control unit 303 to be described below, the operation unit 105, and a part of a main board of the controller 103. Also, when the power supply switch 110 is in an OFF state, power feeding to each unit is not immediately stopped. In this case, after waiting for appropriate termination processing for software or hardware, power feeding to portions other than a portion, such as a part of the power supply control unit 303, which is used to turn on the power supply switch 110 again, is stopped.

Figure 2:
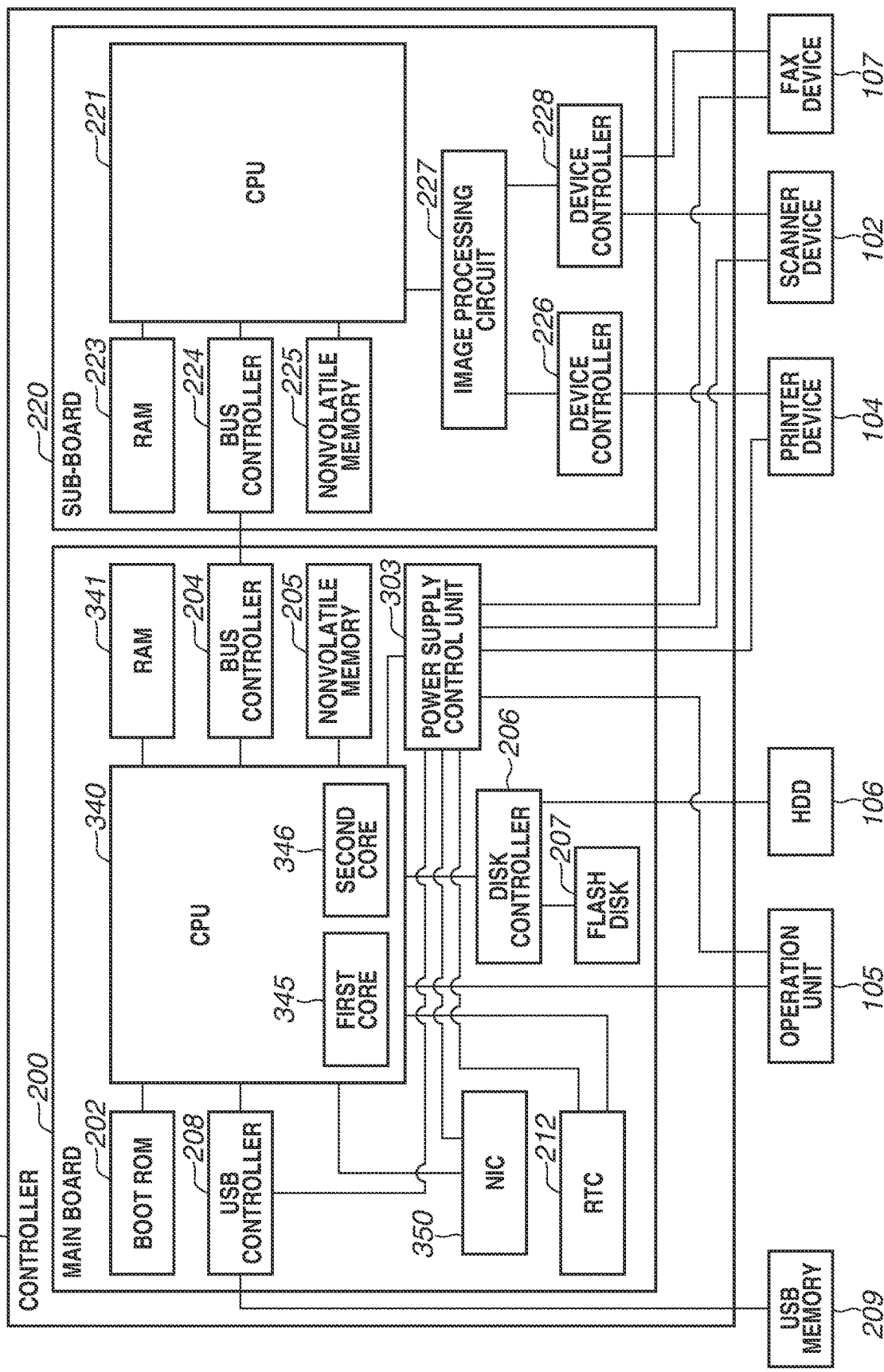
FIG. 2 is a block diagram illustrating a hardware configuration of a controller and peripheral devices of an image forming apparatus.

Next, FIG. 2 is a block diagram illustrating a hardware configuration of the controller 103 and peripheral devices of the image forming apparatus 101 according to the present exemplary embodiment.

The controller 103 includes a main board 200 as a single central processing unit (CPU) system, and a sub-board 220 as a CPU system which is relatively smaller than the main board 200.

The main board 200 is a general-purpose CPU system. The main system 100 includes pieces of hardware as illustrated in FIG. 2, and each piece of hardware is connected to an internal bus.

A CPU 340 executes software programs stored in a random access memory (RAM) 341, and controls the overall operation of the controller 103. The CPU 340 includes a first core 345 and a second core 346. The first core 345 and the second core 346 can communicate with each other using a common nonvolatile memory 205 or the like. While the present exemplary embodiment illustrates a configuration in which the CPU 340 includes two cores, the number of cores is not particularly limited as long as the CPU 340 includes a plurality of cores.

A boot read-only memory (ROM) 202 stores programs (e.g., a boot program) to be executed by the CPU 340 immediately after a reset state of the CPU 340 is released, fixed parameters, and the like. The boot program indicates a storage location of a program to be subsequently executed by the CPU 340. In the present exemplary embodiment, the storage location corresponds to the nonvolatile memory 205.

The nonvolatile memory 205 stores operation programs to be executed by the CPU 340 after the boot program is executed. The operation programs include an operating system (OS). The operation programs also include programs for performing initial settings for a network interface card 350, a universal serial bus (USB) controller 208, and a bus controller 204.

The bus controller 204 functions as a transfer device that transfers data designated by the CPU 340 and an address where the data to be written to the sub-board 220 from the main board 200. The bus controller 204 also functions as a reception device that receives data transferred to the main board 200 from the sub-board 220.

The operation programs stored in the nonvolatile memory 205 include an application program for the main board 200 to run on the OS. In the application program, addresses of devices which are connected to the internal bus in the main board 200 and to an internal bus in the sub-board 220 are described in advance. The CPU 340 accesses each device using the corresponding address when the application program is executed.

The nonvolatile memory 205 is a storage composed of a semiconductor disk. The RAM 341 is a volatile RAM which is used as a main memory (work memory) for the CPU 340. The CPU 340 loads the operation programs stored in the nonvolatile memory 205 into the RAM 341 and executes the loaded operation programs. The operation programs are control programs for each storage (a flash disk 207, the HDD 106) and the power supply control unit 303.

Upon receiving a power state transition instruction from the CPU 340, the power supply control unit 303 controls power supply to each device in response to the instruction.

A disk controller 206 is a controller that controls each storage connected to the disk controller 206. In the present exemplary embodiment, the disk controller 206 controls data read and write operations on the flash disk 207 and the HDD 106. The flash disk 207 is a storage composed of a semiconductor disk such as a solid state drive (SSD).

A real-time clock (RTC) 212 is a real-time clock circuit which is a piece of hardware for measuring time and counting time at regular intervals. The RTC 212 operates based on power supplied from an internal battery. Accordingly, the RTC 212 can constantly operate even when operation of the controller 103 is stopped. The RTC 212 is capable of generating an interrupt signal at a predetermined time or at predetermined intervals based on a value that is written into a register in the RTC 212 from CPU 340, thereby notifying the connected CPU 340 of an interrupt.

The network interface card 350 controls communication with an external device using a network via a network IF (not illustrated).

The USB controller 208 controls a USB memory 209 which is connected to the image forming apparatus 101 via a USB IF (not illustrated).

The sub-board 220 is a CPU system that controls an image processing function. The sub-board 220 includes pieces of hardware as illustrated in FIG. 2.

A bus controller 224 receives, from the bus controller 204, data designated by the CPU 340 and an address where the data is to be written, and stores the data at the received address (address of a nonvolatile memory 225).

A CPU 221 executes a program stored in the nonvolatile memory 225 when the reset state of the CPU 221 is released after power-on. This program is a boot program for the CPU 221. This program indicates a location where an operation program to be subsequently executed by the CPU 221 after the boot program is executed is stored. In the present exemplary embodiment, the location is a specific address of the nonvolatile memory 225. The operation program is loaded into the nonvolatile memory 225 when the program is executed. A RAM 223 is a RAM to be used as a main memory (work memory) for the CPU 221. The operation program is also used as a control program for the image processing function.

The CPU 221 executes the boot program written into the nonvolatile memory 225 in response to an instruction from the CPU 340. Thus, the CPU 221 controls each of the printer device 104, the scanner device 102, and the FAX device 107 via an image processing circuit 227 and device controllers 226 and 228.

For example, when a user sends an image copying instruction using the operation unit 105, the CPU 340 causes the CPU 221 to execute a control operation related to image copying processing. Specifically, the CPU 340 sends an image reading instruction to the scanner device 102 via the CPU 221. Then, the scanner device 102 optically scans an image on a paper document, converts the scanned image into digital image data, and outputs the digital image data to the image processing circuit 227 via the device controller 228. The image processing circuit 227 transfers the digital image data to the nonvolatile memory 225 via the CPU 221 and temporarily stores the digital image data in the nonvolatile memory 225.

Next, upon confirming that all digital image data is stored in the nonvolatile memory 225, or that a certain amount of digital image data is stored in the nonvolatile memory 225, the CPU 340 sends an image output instruction to the printer device 104 via the CPU 221. At this time, the CPU 221 notifies the image processing circuit 227 of an image data storage location (storage address) in the nonvolatile memory 225. Then, the device controller 226 transmits the image data held in the nonvolatile memory 225 to the printer device 104 according to a synchronization signal received from the printer device 104. As a result, the printer device 104 prints the digital image data on a sheet.

Figure 3:
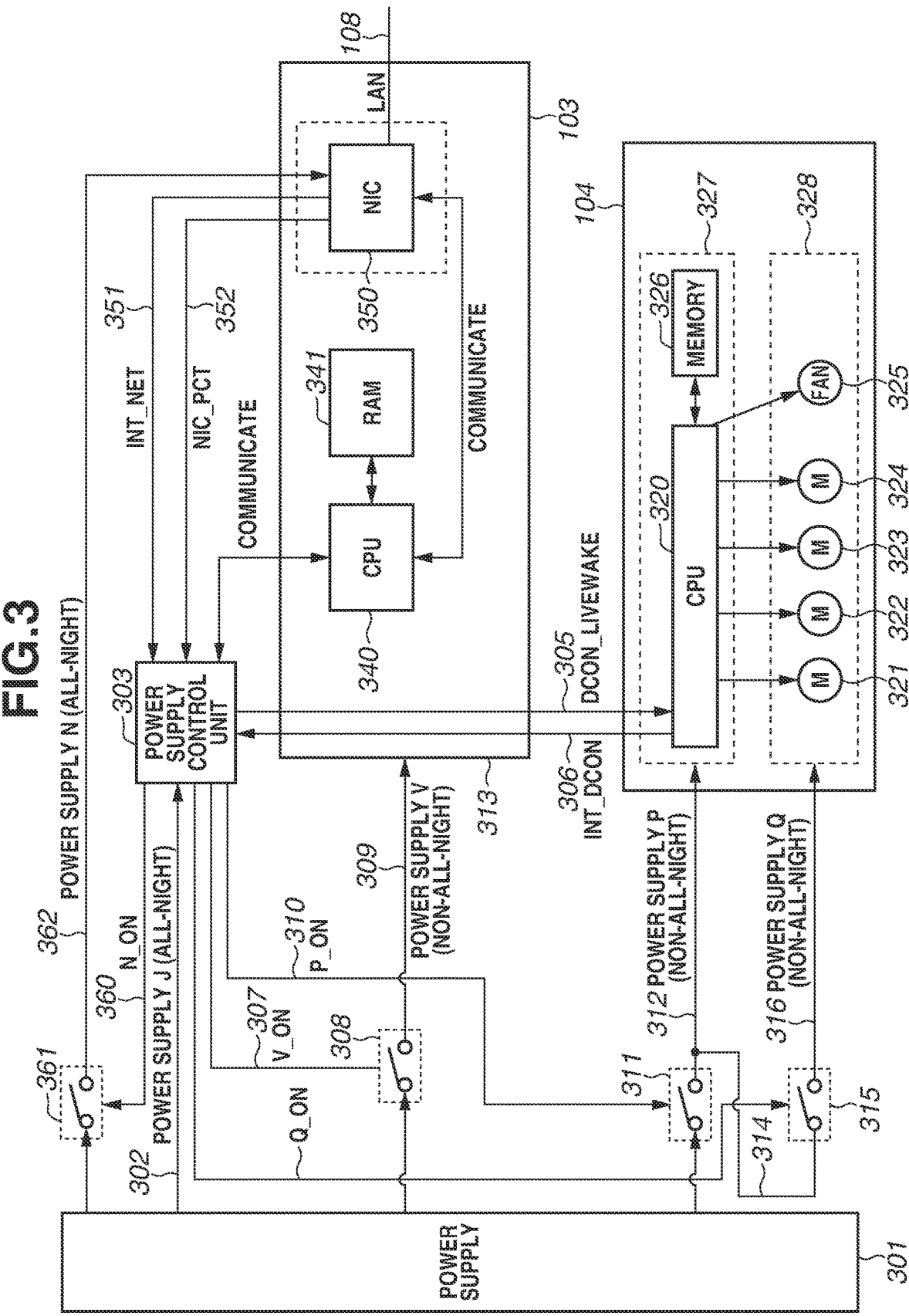
FIG. 3 is a block diagram illustrating a configuration of a power supply of the image forming apparatus.

FIG. 3 is a block diagram illustrating a configuration of a power supply of the image forming apparatus 101 illustrated in FIG. 1. The configuration of the controller 103, the printer device 104, the power supply control unit 303, and a power supply 301 in the image forming apparatus 101 will be described with reference to FIG. 3.

Referring to FIG. 3, the power supply control unit 303 is constantly supplied with power via a power supply line J 302 which functions as a first power supply line. The power supply line J 302 is energized even when the image forming apparatus 101 is in the OFF state, and a power control operation for the power supply line J 302 is performed.

The power supply control unit 303 is preliminarily programmed to execute an operation as described below. Specifically, a relay switch 308 is switched by an IO signal V_ON (a power supply control signal 307) which functions as a first power supply control signal so that power feeding to the controller 103 from the power supply 301 is controlled via a power supply line V 309 which functions as a second power supply line. Further, a plurality of timer values is set for the power supply control unit 303 by the CPU 340 via communication, and the power supply control unit executes an operation set by the CPU 340 upon start-up of a timer.

A relay switch 311 is switched by an IO signal P_ON (a power supply control signal 310) which functions as a second power supply control signal. As a result, power feeding from the power supply 301 to a printer control unit 327, including a CPU 320 functioning as a logic system circuit for the printer device 104 and a memory 326, is controlled via a power supply line P 312 which functions as a third power supply line.

Further, a relay switch 315 is switched by an IO signal Q_ON which is a sub-signal of the second power supply control signal. As a result, power feeding from the power supply 301 to a printing unit 328, which is a high-load system device of the printer device 104, is controlled via a power supply line Q 316 which is a sub-line of the third power supply line.

The printing unit 328 includes fixing units 321 to 324 and a fan 325 for the marking unit 141.

The power supply line Q 316 described above is not necessarily be a sub-line of the power supply line P 312, but instead may be drawn from the power supply 301. The relay switch 315 is controlled by the power supply control unit 303, but instead can be controlled by the CPU 320 or the like. Further, the printing unit 328 may include the paper feed unit 142, the marking unit 141, and the paper discharge unit 143.

A predetermined IO signal is operated in response to an instruction from the CPU 320. An example of the IO signal to be operated is a DCON_LIVEWAKE signal 305 which is connected to the CPU 320 of the printer device 104. When the printer device 104 is powered on in a state where the DCON_LIVEWAKE signal 305 is asserted, the printer device 104 is restored without performing any specific operation for controlling a movable unit or using power.

Examples of the specific operation include a rotation operation of a motor, a roller, a polygon, or the like, temperature control of the fixing units 321 to 324, and heat exhausting processing by the fan 325.

Although not illustrated, like the printer device 104, the power supply of the scanner device 102 can be controlled from the power supply control unit 303. However, the power supply control is performed in the same manner as described above, and thus the description thereof is herein omitted. That is, the power supply control operation for the scanner device 102 is performed in the same manner as that for the printer device 104.

Although not illustrated, the FAX device 107 includes a reception unit that receives data, and a data processing unit that processes the received data.

Power feeding for each block as illustrated in FIG. 3 is implemented by, for example, forming the relay switch 308 into a two-system configuration. For example, this configuration can be implemented such that, in a sleep state, only the relay switch connected to a block to be turned off is turned off, while the other relay switch is controlled to be kept on. In a shut-down state, the relay switches of the both systems are turned off. In this case, a binary signal is not used as the power supply control signal, but instead a multi-valued control signal is used depending on the energized state. Although not described in the present exemplary embodiment, in the above-described power states, including the sleep state and the shut-down state, power is supplied by the control processing as described above.

Specifically, the power supply control unit 303 switches a relay switch 361 using an IO signal N_ON 360, which functions as a third power supply control signal, thereby controlling power feeding from the power supply 301 to a network interface card (NIC) 350 via a power supply line 362 which is an example of the third power supply line. In the controller 103, only the NIC 350 is individually provided with power.

Unlike other non-all-night power supplies, the power supply line 362 is supplied with power in the sleep state, as well as in a normal state, thereby enabling network wakeup. In the shut-down state, no power is fed to the NIC 350 unless a setting such as Wake On LAN is effective. Power is constantly fed to the power supply line 362 via the relay switch 361, except in the OFF state, and thus a redundant description thereof will be omitted.

Next, power states of the image forming apparatus 101 will be described with reference to FIG. 4 which is a transition diagram illustrating the power states of the image forming apparatus 101. The image forming apparatus 101 includes a plurality of power states. For example, the image forming apparatus 101 includes a power state A, a power state B where power consumption is less than that in the power state A, and a power state C where power consumption is less than that in the power state B. Each power state will be described in detail below.

<Power Supply Monitoring 1 by Power Supply Control Unit 303: Power Feeding at Start-Up>

First, start-up processing performed by the image forming apparatus 101 will be described. To use the image forming apparatus 101, an operator turns on the power supply switch 110. Then, the power supply control unit 303 detects that the power supply 301 is turned on based on the energization from the power supply line J 302, and the relay switches 308 and 311 are turned on by the power supply control signals 307 and 310, respectively, so that the power supply 301 supplies power to the entire apparatus.

The power supply control unit 303 supplies power to the entire system when the power supply 301 is turned on. Specifically, the power supply control unit 303 energizes the components of the main board 200 and the sub-board 220, which are included in the controller 103, the printer device 104, the scanner device 102, the FAX device 107, and the like via each direct-current (DC) power supply path. The first core 345 and the second core 346 included in the CPU 340 are each supplied with power.

Initialization of the printer device 104, the scanner device 102, and the FAX device 107 is started by each control unit for controlling the corresponding device when the power supply is turned on.

When energization is performed, the CPU 340 of the controller 103 initializes the pieces of hardware. Examples of processing associated with the initialization of hardware include register initialization, interrupt initialization, registration of device drivers at the time of kernel start-up, and initialization of the operation unit 105.

Further, the CPU 340 of the controller 103 initializes software. Examples of processing associated with the initialization of software include calling of an initialization routine for each library, start-up of processes and threads, start-up of software services for communication with the printer device 104 and the FAX device 107, and drawing of the operation unit 105. After completion of all processes, the image forming apparatus 101 transitions to a standby state where jobs are executable.

Figure 4:
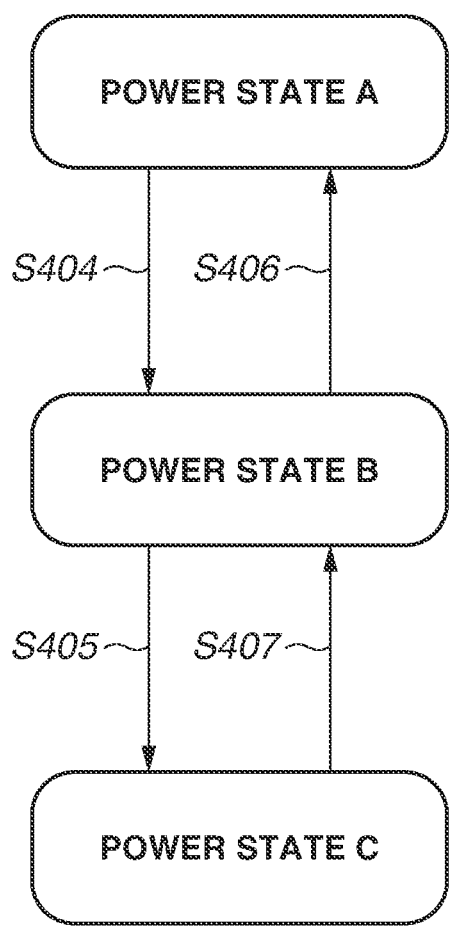
FIG. 4 is a transition diagram illustrating power states of the image forming apparatus.

The power state A illustrated in FIG. 4 corresponds to the standby state. The standby state indicates at least one of the following states. That is, a state where devices associated with a control operation for a controller board are energized, a state where jobs are executable, and a state where a device with a limited lifetime (e.g., the number of turning-on operations, or an energization time) is used. For example, the standby state is a state where a relay switch or a silicon switch is turned on based on a FAX incoming call or pressing on a touch panel, thereby enabling use of at least one of devices that use a large amount of power, such as a printer, a scanner, or an operation unit.

<Power Supply Monitoring 2 by Power Supply Control Unit 303: Power Feeding in Standby State>

In the standby state, the components of the controller 103 are each supplied with power. Specific examples of the components include the components of the main board 200, such as the CPU 340 (first core 345, second core 346) and the RAM 341, and the components of the sub-board 220, such as the image processing circuit 227 and the CPU 221. Now, a power supply operation to be performed when at least one of the printer device 104, the scanner device 102, and the FAX device 107 is not used in the standby state will be described.

The standby state is not limited to the state where all units are supplied with power. For example, the standby state may indicate a state where power is not fed to the printer device 104 in a case where a print job is not executed for a predetermined time period. Further, the standby state may indicate a state where power is not fed to the scanner device 102 when the operation unit 105 is not lit up and it is obvious that the user is not present in front of the image forming apparatus 101.

Further, the standby state may indicate a state where power is not supplied to at least a part of an internal configuration of the image forming apparatus 101 (e.g., a transfer unit of a printer) when power is fed to the image forming apparatus 101 in advance to facilitate job processing for the printer device 104 and the scanner device 102.

The power state where power is supplied to the scanner device 102 and the printer device 104 and the power state where power is not supplied to the scanner device 102 and the printer device 104 are herein collectively referred to as the standby state. However, these power states may be treated differently. The power state where power is not supplied to the scanner device 102 and the printer device 104 is referred to as the sleep state (first sleep state). The state where power is supplied to the scanner device 102 and the printer device 104 and jobs are executable is referred to as the normal state.

<Power Supply Monitoring 3 by Power Supply Control Unit 303: Power Feeding During PDL Printing>

Next, power feeding in a state where the printer device 104 and the scanner device 102 are used in a PDL printing state of the image forming apparatus 101 in the standby state will be described.

First, power supply ON/OFF control of the printer device 104 will be described using the image printing function as an example.

The NIC 350 receives data from the computer 109 via the LAN 108. The received data is stored in the RAM 341. The CPU 340 analyzes the received data and generates print data in the case of executing the image printing function.

The CPU 340 sends a notification to the power supply control unit 303, switches the relay switch 311 using the power supply control signal 310, and feeds power to the printer device 104 from the power supply 301 via the power supply line P 312.

When the printer device 104 is ready to use, the CPU 340 executes a print job. The CPU 340 transmits data to the RAM 341, the bus controller 204, the bus controller 224 of the sub-board 220, and the CPU 221 of the sub-board 220. Further, the CPU 340 transmits data to the printer device 104 via an image processor and the device controller 226. The printer device 104 prints the received data, and after completion of printing, the printer device 104 sends the printing result to the CPU 340. After completion of printing, the CPU 340 turns off the relay switch 311 via the power supply control unit 303. As a result, the power supply of the printer device 104 is turned off. The present exemplary embodiment illustrates a configuration in which power is supplied to the printer device 104 after transition from the state where power is not supplied to the printer device 104. A description of processing for supplying power to the printer device 104 when data is received in a state where power is supplied to the printer device 104 is herein omitted.

<Power Supply Monitoring 4 by Power Supply Control Unit 303: Power Feeding During Transition to Sleep State>

Next, sleep transition processing for the controller 103 will be described. If a predetermined condition is satisfied when the image forming apparatus 101 is in the normal state, the image forming apparatus 101 transitions to a connect sleep state (second sleep state). Specifically, if a predetermined time period has elapsed in the standby state while the image forming apparatus 101 is not used by the user, the CPU 340 notifies the power supply control unit 303 of the transition to the connect sleep state. The power supply control unit 303 which has received the notification changes power feeding to the controller 103. The connect sleep state corresponds to the power state B illustrated in FIG. 4 and indicates a state where a device with a limited lifetime is used.

<Power Supply Monitoring 5 by Power Supply Control Unit 303: Power Feeding in Connect Sleep State>

In the connect sleep state, power is supplied to devices associated with execution of functions for responding to a communication received from an external device via a network. Specifically, power is supplied to at least the components of the main board 200 and to at least the CPU 221, the RAM 223, the bus controller 224, and the nonvolatile memory 225 in the sub-board 220. Further, power is supplied to the FAX device 107, the operation unit 105, the HDD 106, and the USB memory 209. Then, the power supply to at least the image processing circuit 227 among the components included in the sub-board 220 is stopped, and the power supply to the printer device 104, the scanner device 102, and the like is also stopped. In this case, the power supply to one of the first core 345 and the second core 346 of the CPU 340 is stopped. The following description is made assuming that the second core 345 is suspended in the sleep state. While the present exemplary embodiment illustrates a configuration in which the power supply to one of the two cores is stopped, in a case where two or more CPU cores are used, the CPU cores other than one core (CPU core used for boot processing) are caused to transition to a suspended state. Core suspend processing will be described in detail below.

The present exemplary embodiment illustrates a configuration in which power is supplied to each of the operation unit 105, the HDD 106, and the USB memory 209, but instead, the power supply to each of the operation unit 105, the HDD 106, and the USB memory 209 may be stopped. The present exemplary embodiment illustrates a configuration in which power is supplied to each of the CPU 221, the RAM 223, the bus controller 224, and the nonvolatile memory 225 in the sub-board 220, but instead, the power supply to each of the CPU 221, the RAM 223, the bus controller 224, and the nonvolatile memory 225 may be stopped.

<Power Supply Monitoring 6 by Power Supply Control Unit 303: Power Feeding in Connect Sleep State>

Restoration processing for the controller 103 will be described. Upon receiving a restoration factor in the connect sleep state, the image forming apparatus 101 transitions to the standby state. Examples of the restoration factor include a FAX incoming call, opening of an auto document feeder (ADF) of the scanner device 102 or a pressing plate of the scanner device 102, placement/removal of paper on a multi-manual feed tray, opening/closing of a front door of the image forming apparatus 101, and pressing of a power saving key. Upon receiving the restoration factor, the power supply control unit 303 resumes power supply to at least the image processing circuit 227 and power supply to the second core 346 of the CPU 340. Depending on the restoration factor, power supply to the printer device 104, the scanner device 102, the FAX device 107, or the like is resumed. For example, when the restoration factor indicates a print job, power supply to the printer device 104 is resumed in this case, and when the restoration factor indicates a FAX job, power supply to the printer device 104 and the FAX device 107 is resumed.

<Power Supply Monitoring 7 by Power Supply Control Unit 303: Power Feeding During Transition to Deep Sleep State>

Next, deep sleep transition processing for the controller 103 will be described. If a predetermined condition is satisfied when the image forming apparatus 101 is in the normal state, the image forming apparatus 101 transitions to a deep sleep state (third sleep state). The deep sleep state corresponds to the power state C illustrated in FIG. 4.

Specifically, if a predetermined time period has elapsed in the normal state while the image forming apparatus 101 is not used by the user, the CPU 340 notifies the power supply control unit 303 of the transition to the deep sleep state. The power supply control unit 303 which has received the notification changes power feeding to the controller 103. As described above, power feeding for each block is implemented by, for example, forming the relay switch 308 into a two-system configuration in which, in the deep sleep state, only the relay switch connected to a block to be turned off is turned off, while the other relay switch is controlled to be kept on.

<Power Supply Monitoring 8 by Power Supply Control Unit 303: Power Feeding in Deep Sleep State>

Next, the deep sleep state of the image forming apparatus 101 will be described. The deep sleep state is a state where a start-up time can be reduced as compared with normal start-up, while the amount of power consumption is reduced. The image forming apparatus 101 transitions to the deep sleep state, for example, when a predetermined time period has elapsed in a state where the image forming apparatus 101 is not operated by the user, when the power saving key on the operation unit 105 is pressed, or when a preset time has come.

In the deep sleep state, power is fed to the RAM 341 of the controller 103, an interrupt controller, the network interface card 350, the RTC 212, the USB controller 208, and the like. Further, power is also supplied to the power saving key on the operation unit 105, a part of the FAX device 107, various sensors, and the like. On the other hand, power is not supplied to at least the CPU 340. Specifically, power is not supplied to the first core 345 and the second core 346 of the CPU 340. A sleep restoration factor varies depending on the system to be used, and thus the power feeding processing in the sleep state is not limited to this configuration.

<Power Supply Monitoring 9 by Power Supply Control Unit 303: Power Feeding During Sleep Restoration>

Next, processing to be performed by the controller 103 during restoration from the deep sleep state to the standby state will be described. Upon receiving a power saving key pressing event, which is a restoration factor, in the sleep state, the power supply control unit 303 restores the CPU 340 from the sleep state. The CPU 340 notifies the power supply control unit 303 of the restoration from the sleep state. After that, the power supply control unit 303 turns on the relay switch 308 and the relay switch 311 by the power supply control signal 307 and the power supply control signal 310, respectively. As a result, power is fed to each of the controller 103, the printer device 104, and the scanner device 102. Although not illustrated in FIG. 3, the power supply control signal for the scanner device 102 can be shared with the printer, or can be prepared as a signal (not illustrated).

A software operation to be performed in the sleep restoration state will be described. The power supply control unit 303 receives an interrupt from at least one of a network, the RTC 212 that detects a timer or alarm, a FAX that detects an incoming call or off-hook operation, a software switch, various sensors, and a USB that detects insertion/removal or communication, and starts power feeding.

The power supply control unit 303 notifies the CPU 340 of the interrupt cause, and the CPU 340 which has received the notification performs processing (restoration processing) for restoring the software state to the normal state.

When a predetermined time period has elapsed after completion of the print job, the CPU 340 transitions to the deep sleep state again. The CPU 340 notifies the power supply control unit 303 of the transition to the deep sleep state, and the power supply control unit 303 turns off the relay switch 311 by using the power supply control signal 310 to stop power feed to the components other than the controller 103.

Similarly, assume a case where a network reception event, which is an example of the restoration factor from the deep sleep state to the connect sleep state, occurs in the deep sleep state. The power supply control unit 303 receives the restoration factor and turns on the relay switch 308 by the power supply control signal 307 to feed power to the controller 103. As a result, at least a part (first core 345) of the CPU 340 is restored from the sleep state. If no job is generated, or if there is no need to acquire device information, the printer device 104 and the scanner device 102 may be supplied with no power. This processing will be described in detail below.

Next, the power states of the CPU 340 as illustrated in FIG. 4 will be described.

In the power state A, each CPU core of the CPU 340 is in an operation state. If a predetermined condition is satisfied, in step S404, the power state transitions from the power state A to the power state B.

In the power state B, the CPU 340 causes a plurality of CPU cores other than one core (that executes boot processing) included in the CPU 340 to transition to a CPU suspended state (normally, clock gating) during the state transition in step S404.

The term "clock gating" refers to a state (stop clock) where input of a clock to a CPU core is stopped and power supply of the CPU core is not turned off. The amount of power consumption in this state is substantially the same as that when the power supply is turned off. Interrupt signal processing can be received by the first core (first core 345), and thus there is no need to cause the second core (second core 346) and subsequent cores to be in the standby state by Wait For Interrupt (WFI).

However, as described above, the CPU cores can be brought into the CPU suspended state by a plurality of methods, such as clock gating, power Gating® (power supply ON/OFF), and WFI. An intellectual property (IP) core capable of controlling power for each CPU core can be implemented by power gating.

Then, after the use of the CPU 340 by the system to send a network response or the like is finished, the CPU 340 transitions from the power state B to the power state C. In this case, the CPU 340 causes the first core 345, which is in the operation state, to transition to the suspended state (normally, clock gating) during the state transition in step S405.

In the power state C, when a job (e.g., a print job) is received, the CPU 340 transitions to the power state A via the power state B, via step S407 and step S406. In this case, the CPU 340 performs resume processing to restore the first core 345 to the operation state. After that, the CPU 340 performs resume processing to restore the plurality of cores (second core 346) to the operation state. After completion of transition to the power state A, the job is executed. If the job is received in the power state C, the CPU 340 may directly transition to the power state A.

The present exemplary embodiment illustrates an example where job reception is set as a condition for transition from the power state C to the power state A. However, as the condition for transition from the power state C to the power state A, for example, a notification other than a network packet incoming call, or a notification such as an incoming call to a job notification port as an example of the network packet incoming call may also be used. While the present exemplary embodiment described above illustrates a case where the power state transitions from the power state C to the power state A via the power state B, the power state may transition from the power state C to the power state A without passing through the power state B. In such a case, the first core 345 and the second core 346 are brought into the operation state at once.

On the other hand, upon receiving a notification, such as a network packet incoming call or network linkup, in the power state C, the CPU 340 transitions to the power state B as illustrated in step S407. During transition to the power state B, the CPU 340 performs resume processing to restore the first core 345 to the operation state. When a predetermined time period has elapsed after the use of the CPU 340 by the system to send a network response or the like is finished, the CPU 340 transitions from the power state B to the power state C.

According to this configuration, in the case of receiving a notification such as a network packet incoming call, processing can be executed by a minimum necessary number of CPU cores. This makes it possible to reduce a time required for system suspend/resume processing.

Figure 5:
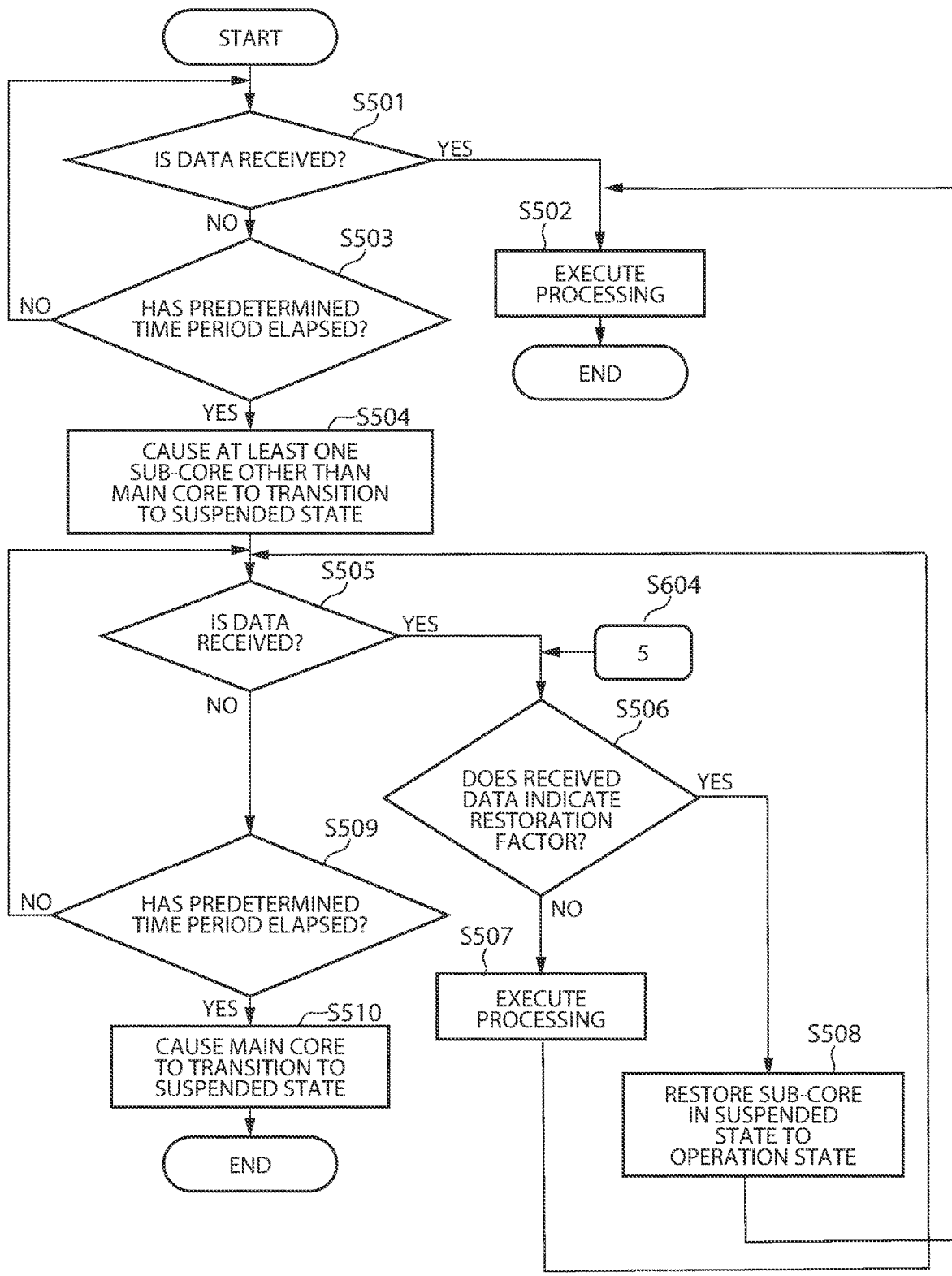
FIG. 5 is a flowchart illustrating a transition of the power state of the image forming apparatus.

FIG. 5 is a flowchart illustrating a transition of the power state of the image forming apparatus 101 according to the present exemplary embodiment.

A program for executing processing in the flowchart illustrated in FIG. 5 is stored in the boot ROM 202 or the nonvolatile memory 205 illustrated in FIG. 2, is loaded into the RAM 341, and is then executed by the CPU 340.

This flowchart is started in the standby state. In the standby state, the first core 345 and the second core 346 of the CPU 340 are in the operation state.

In step S501, if data is received (YES in step S501), the processing proceeds to step S502. In step S502, the CPU 340 executes processing based on the received data. For example, if print data is received in step S501, the CPU 340 causes the printer device 104 to execute print processing. After completion of step S502, the processing in the flowchart is terminated.

In step S501, if data is not received (NO in step S501), the processing proceeds to step S503. Then, steps S503 and S501 are repeated until a predetermined time period has elapsed without receiving any data. In step S503, if the predetermined time period has elapsed without receiving any data (YES in step S503), the processing proceeds to step S504.

In step S504, the CPU 340 causes the image forming apparatus 101 to transition from the standby state to the connect sleep state, and performs suspend processing to bring the second core 346 into the suspended state while maintaining the first core 345 of the CPU 340 in the operation state. After completion of step S504, the processing proceeds to step S505.

In step S505, if the CPU 340 receives data (YES in step S505), the processing proceeds to step S506. In step S506, the CPU 340 (first core 345) determines whether the received data indicates a restoration factor. If the received data indicates the restoration factor (YES in step S506), the processing proceeds to step S508.

In step S508, the CPU 340 (first core 345) causes the image forming apparatus 101 to transition from the connect sleep state to the standby state and performs resume processing to restore the second core 346 in the suspended state to the operation state. After completion of step S508, the processing returns to step S502. In step S502, the CPU 340 executes processing based on the received data. After completion of step S502, the processing in the flowchart is terminated.

In step S506, if the CPU 340 (first core 345) determines that the received data does not indicate the restoration factor (NO in step S506), the processing proceeds to step S507. In step S507, the CPU 340 (first core 345) executes processing based on the received data. For example, the CPU 340 (first core 345) sends a response to a network packet incoming call. After completion of step S507, the processing returns to step S505.

In step S505, if data is not received (NO in step S505), the processing proceeds to step S509. In step S509, if the predetermined time period has not elapsed (NO in step S509), the processing returns to step S505. If the predetermined time period has elapsed (YES in step S509), the processing proceeds to step S510. In step S510, the CPU 340 causes the image forming apparatus 101 to transition from the connect sleep state to the deep sleep state and performs suspend processing to cause the first core 345 to transition to the suspend state. After completion of step S510, the processing in the flowchart is terminated. In the present exemplary embodiment, the predetermined time period may be 0 seconds. In this case, if data is not received in step S505, the CPU 340 causes the image forming apparatus 101 to transition from the connect sleep state to the deep sleep state immediately.

Figure 6:
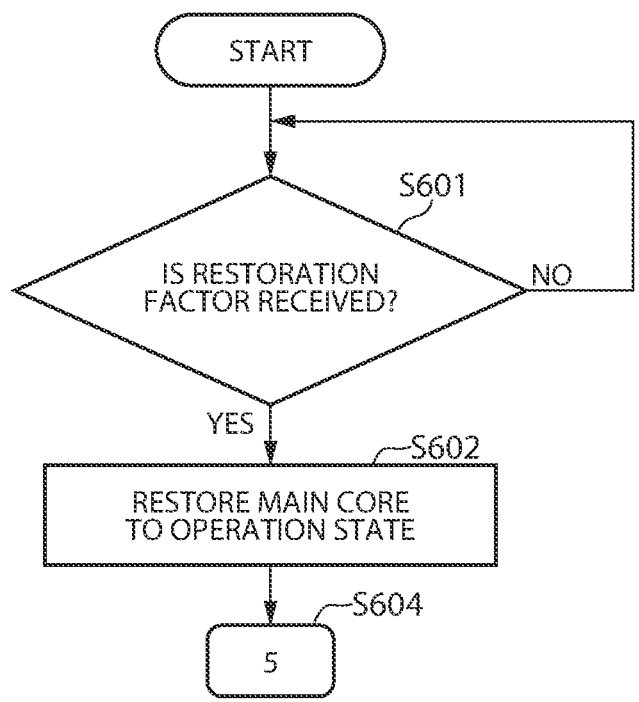
FIG. 6 is a flowchart illustrating processing related to restoration of a main controller and determination of a restoration factor.

Next, a processing flow for restoration of the main controller and determination of the restoration factor according to the present exemplary embodiment will be described. A flowchart illustrated in FIG. 6 is executed by the network interface card 350.

If a restoration factor is received in step S601 (YES in step S601), the network interface card 350 allows power supply to the CPU 340. Then, the CPU 340 maintains the second core 346 in the suspended state and performs resume processing to restore the first core 345 to the operation state. Specifically, in this case, the CPU 340 causes the image forming apparatus 101 to transition from the deep sleep state to the connect sleep state. After completion of the step S602, the processing proceeds to step S506.

Examples of a predetermined restoration factor used in step S602 include a restoration event such as reception of a network packet signal, a facsimile incoming call or off-hook operation, detection of pressing on a user interface (UI) panel, detection of a human by a human presence sensor, and detection of a document by the scanner device 102. Examples of a factor that does not correspond to the predetermined restoration factor include a response to a link confirmation received from an external device.

As described above, according to the configuration of the present exemplary embodiment, in a case where the image forming apparatus 101 is in the power state where power is not supplied to the CPU, when the predetermined restoration factor is received, only the necessary core among the plurality of cores included in the CPU is restored to the operation state to execute processing. Then, after completion of the processing, if no data is received, the core restored to the operation state is caused to transition to the suspended state. Accordingly, the time required for system suspend/resume processing can be reduced as compared with the configuration of related art in which all the plurality of cores included in the CPU is restored upon reception of restoration factor. Furthermore, the time during which the CPU cannot recognize an interrupt signal can be reduced.

A second exemplary embodiment will be described. The second exemplary embodiment differs from the first exemplary embodiment in that a device driver for an internal device, such as the image processing circuit 227, in the image forming apparatus 101 is unloaded or loaded depending on the transition of the power state. The configurations and illustrations in FIGS. 1 to 3 according to the second exemplary embodiment are similar to those according to the first exemplary embodiment, and thus the descriptions thereof are omitted.

First, the power states according to the present exemplary embodiment will be described with reference to FIG. 4. Descriptions of components similar to those of the first exemplary embodiment are omitted.

In the power state A, the device driver for the image processing circuit 227 is loaded by the CPU 340. The state where the device driver for the image processing circuit 227 is loaded indicates a state where the image processing circuit 227 is usable.

In each of the power state B and the power state C, the device driver for the image processing circuit 227 is unloaded by the CPU 340. The state where the device driver for the image processing circuit 227 is unloaded indicates a state where the image processing circuit 227 is unusable.

The present exemplary embodiment illustrates an example where the device driver for the image processing circuit 227 is used. However, any internal device may be used as long as the loaded state and the unloaded state can be switched based on the transition of the power state.

Figure 7:
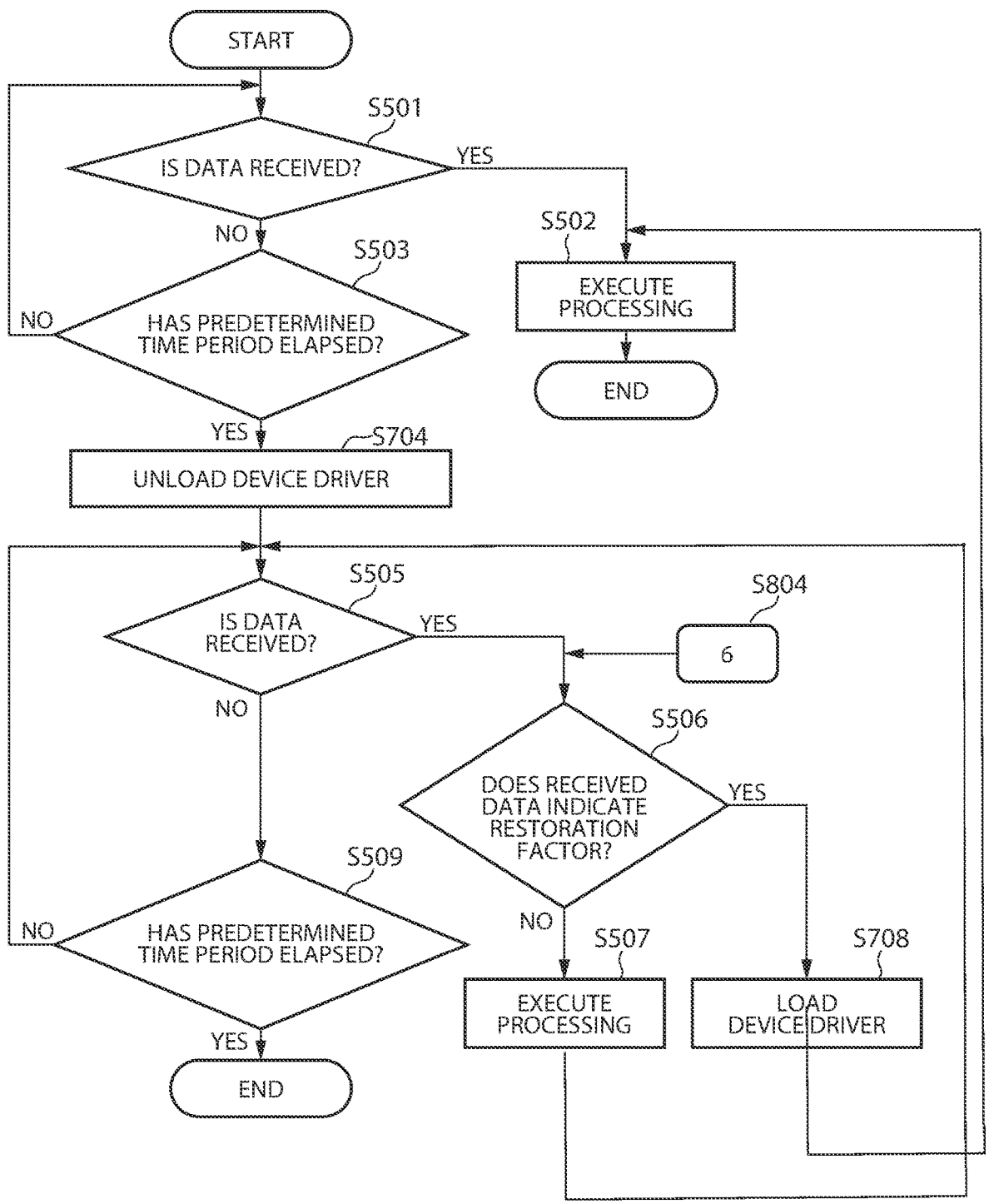
FIG. 7 is a flowchart illustrating a transition of the power state of the image forming apparatus.

Next, a transition of the power state of the image forming apparatus 101 according to the present exemplary embodiment will be described with reference to a flowchart illustrated in FIG. 7. A program for executing processing in the flowchart illustrated in FIG. 7 is stored in the boot ROM 202 or the nonvolatile memory 205 illustrated in FIG. 2, is loaded into the RAM 341, and is then executed by the CPU 340. Steps of the flowchart illustrated in FIG. 7 that are similar to those illustrated in FIG. 5 are denoted by the same step numbers, and the descriptions thereof are omitted.

In step S503, if the predetermined time period has elapsed without receiving any data (YES in step S503), the processing proceeds to step S704. In step S704, the CPU 340 unloads the device driver, and causes the image forming apparatus 101 to transition from the standby state to the connect sleep state. After completion of step S704, the processing proceeds to step S505.

In step S506, the CPU 340 determines whether the received data indicates the restoration factor. If the received data does not indicate the restoration factor (NO in step S506), the processing proceeds to step S507. If the received data indicates the restoration factor (YES in step S506), the processing proceeds to step S708.

In step S708, the CPU 340 loads the device driver. After completion of step S708, the processing returns to step S502. In step S509 illustrated in FIG. 7, if the predetermined time period has elapsed (YES in step S509), the CPU 340 causes the image forming apparatus 101 to transition from the connect sleep state to the deep sleep state and then terminates the processing in the flowchart.

Figure 8:
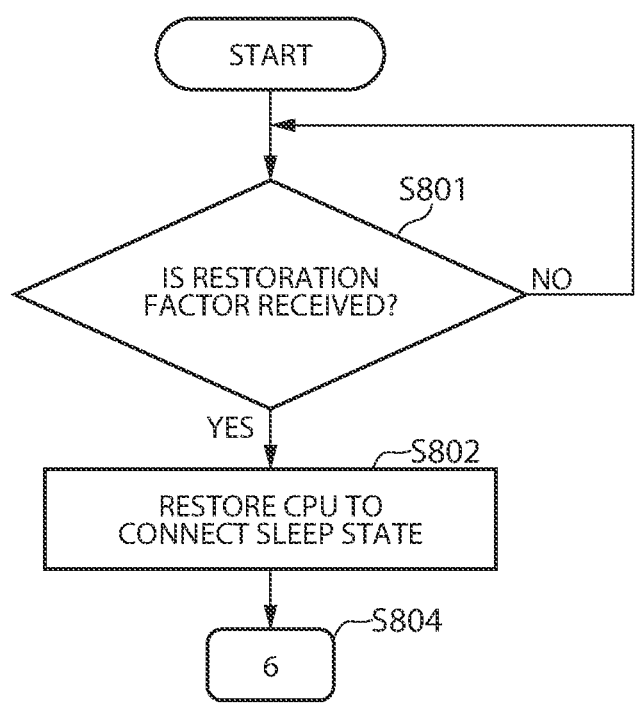
FIG. 8 is a flowchart illustrating processing related to restoration of the main controller and determination of the restoration factor.

Next, a processing flow for restoration of the main controller and determination of the restoration factor according to the present exemplary embodiment will be described. A flowchart illustrated in FIG. 8 is executed by the network interface card 350.

If a restoration factor is received in step S801 (YES in step S801), the processing proceeds to step S802. In step S802, the CPU 340 is caused to supply power to cause the image forming apparatus 101 to transition from the deep sleep state to the connect sleep state. After that, the processing returns to step S506 illustrated in FIG. 7.

In the configuration according to the present exemplary embodiment, the image forming apparatus 101 unloads the device driver for the image processing circuit 227 during transition from the power state A to the power state B. The image forming apparatus 101 does not unload the device driver for the image processing circuit 227 during transition from the power state B to the power state C where system suspend processing is performed.

During transition to from the power state C to the power state B where system resume processing is performed, the image forming apparatus 101 does not load the device driver for the image processing circuit 227. Further, during transition from the power state B to the power state A where an event, such as a user job, is executed, the image forming apparatus 101 loads the device driver for the image processing circuit 227.

According to the configuration described above, the time for transition from the power state B to the power state C and the time for transition from the power state C to the power state B can be reduced, which leads to a reduction in the time required for system suspend/resume processing.

While the second exemplary embodiment illustrates a configuration that is different from the configuration of the first exemplary embodiment, a combination of the configuration of the first exemplary embodiment and the configuration of the second exemplary embodiment may also be used.

In this configuration, during transition from the power state A to the power state B, the image forming apparatus 101 causes a sub-core (second core 346) to transition to the suspended state and unloads the device driver. During transition from the power state B to the power state C, the image forming apparatus 101 causes the first core 345 to transition to the suspended state and does not load the device driver.

Further, during transition from the power state C to the power state B, the image forming apparatus 101 restores the first core 345 to the operation state and does not load the device driver. During transition from the power state B to the power state A, the image forming apparatus 101 restores the sub-core (second core 346) to the operation state and loads the device driver.

A third exemplary embodiment will be described. The third exemplary embodiment differs from the first exemplary embodiment in that a device driver to be loaded when resume processing is performed and a device driver to be unloaded when suspend processing is performed are external devices of the image forming apparatus 101. Descriptions of the configurations and illustrations of the third exemplary embodiment that are similar to those of the first exemplary embodiment and the second exemplary embodiment are omitted.

First, the power states according to the present exemplary embodiment will be described with reference to FIG. 4. Descriptions of components similar to those of the first exemplary embodiment are omitted.

In the power state A, a device driver for a USB host is loaded by the CPU 340. The state where the device driver for the USB host is loaded indicates a state where the USB host is usable.

In each of the power state B and the power state C, if the USB memory 209 is not connected, the device driver for the USB host is unloaded by the CPU 340. The state where the device driver for the USB host is unloaded indicates a state where the USB host is unusable.

On the other hand, in a case where the USB memory 209 is connected during transition from the power state A to the power state B, the device driver for the USB host is loaded in the power state B. In this case, the CPU 340 (first core 345) prohibits the transition to the power state C in the state where the device driver for the USB host is loaded.

Figure 9:
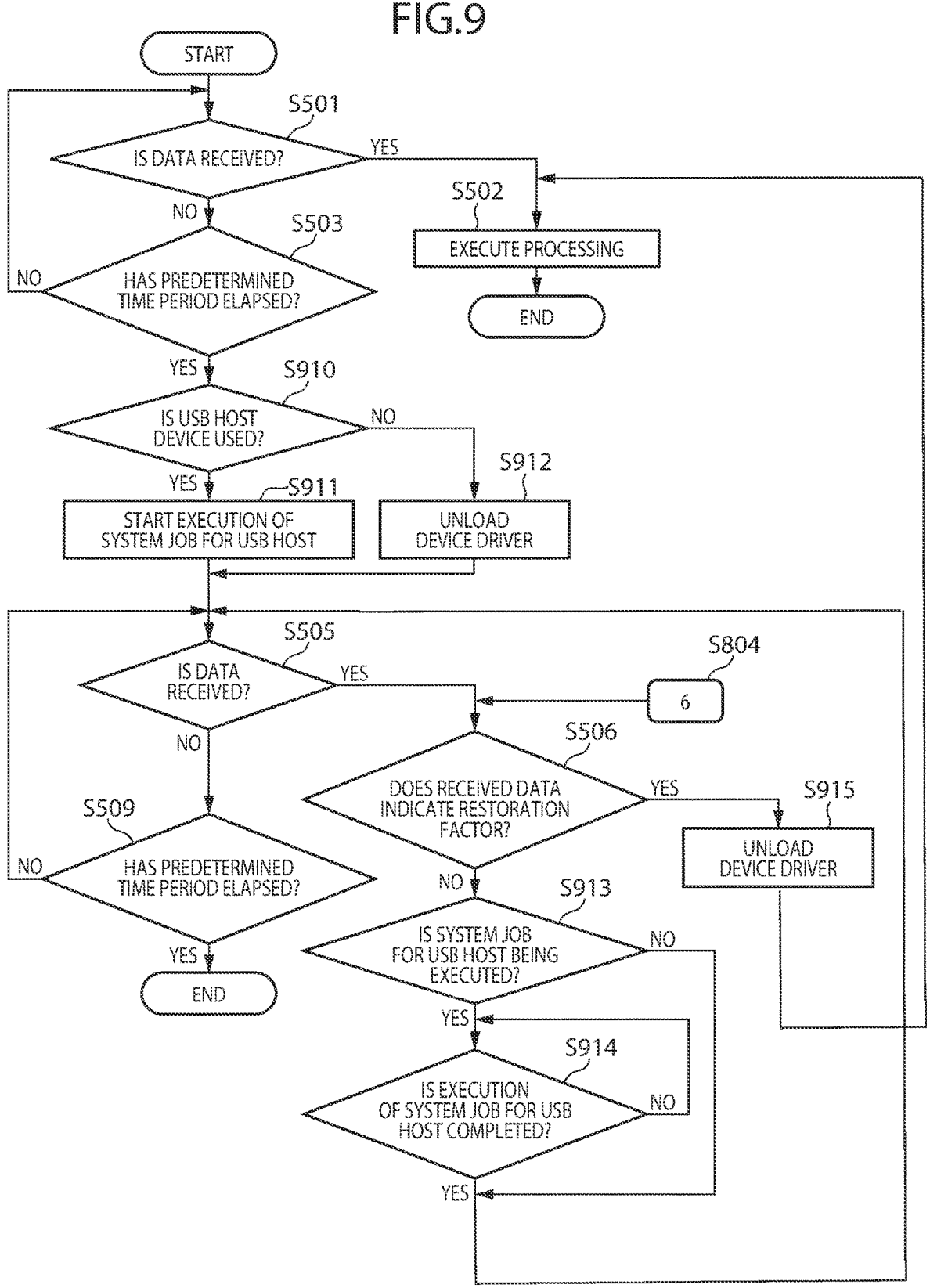
FIG. 9 is a flowchart illustrating a transition of the power state of the image forming apparatus.

Next, a processing flow for transition of the power state of the image forming apparatus 101 according to the present exemplary embodiment will be described with reference to a flowchart illustrated in FIG. 9. A program for executing processing in the flowchart illustrated in FIG. 9 is stored in the boot ROM 202 or the nonvolatile memory 205 illustrated in FIG. 2, loaded into the RAM 341, and then executed by the CPU 340. Steps of the flowchart illustrated in FIG. 9 that are similar to those illustrated in FIG. 5 are denoted by the same step numbers, and the descriptions thereof are omitted.

In step S503, if the predetermined time period has elapsed without receiving any data (YES in step S503), the processing proceeds to step S910. The CPU 340 causes the image forming apparatus 101 to transition from the standby state to the connect sleep state.

In step S910, it is determined whether a USB host device is used. If a USB host device is not used (NO in step S910), the processing proceeds to step S912. In step S912, the device driver for the USB host is unloaded. After completion of step S912, the processing proceeds to step S505.

In a case where the USB host device is used (YES in step S910), the processing proceeds to step S911. In step S911, the CPU 340 receives a system job indicating that the USB host is used, and starts the job. After completion of step S911, the processing proceeds to step S505.

If the processing proceeds to step S505 from step S911, since data for executing the system job has already been received upon starting execution of the system job for the USB host in step S911, the processing proceeds to step S506 from step S505. Then, since it is determined that the received data does not indicate the predetermined restoration factor in step S506, the processing proceeds to step S913. In step S913, it is determined whether the system job is being executed. If it is determined that the system job is not being executed (NO in step S913), the processing returns to step S505. If it is determined that the system job is being executed (YES in step S913), the processing proceeds to step S914. In step S914, it is determined whether the execution of the system job is completed. If it is determined that the execution of the system job is completed (YES in step S914), the processing returns to step S505.

Thus, in a case where the USB host is used, the image forming apparatus 101 does not transition from the connect sleep state to the deep sleep state. In the following description, a condition in which the transition from the connect sleep state to the deep sleep state is prohibited is set as a prohibition condition.

On the other hand, in the case where the processing proceeds to step S505 from the step S912, if data is not received in step S505 (NO in step S505), the processing proceeds to step S509. If the predetermined time period has elapsed (YES in step S509), the image forming apparatus 101 transitions from the connect sleep state to the deep sleep state. If data is received in step S505 (YES in step S505), the processing proceeds to step S506. In step S506, if the received data indicates the predetermined restoration factor (YES in step S506), the processing proceeds to step S915. In step S915, the device driver is unloaded. After completion of step S915, the processing returns to step S502.

In the configuration according to the present exemplary embodiment, the image forming apparatus 101 checks whether the device driver for the USB host is used during transition from the power state A to the power state B. Further, in a case where the device driver for the USB host is not used, the device driver is unloaded to enable transition from the power state B to the power state C.

On the other hand, in a case where the device driver for the USB host is used, the image forming apparatus 101 executes the system job for the USB host and disables transition from the power state B to the power state C.

According to this configuration, when the USB host device is used, the state transitions (steps S405 and S407) between the power state B and the power state C are not carried out. This makes it possible to prevent the use of the USB host device from being disabled in the sleep state and to reduce a system restoration time.

The present exemplary embodiment described above illustrates a configuration different from that of the first and second exemplary embodiments. However, a combination of the configuration of the first exemplary embodiment and the configuration of the third exemplary embodiment, a combination of the configuration of the second exemplary embodiment and the configuration of the third exemplary embodiment, and a combination of the configuration of the first exemplary embodiment, the configuration of the second exemplary embodiment, and the configuration of the third exemplary embodiment may also be used.

An example of the combination of the configuration of the first exemplary embodiment and the configuration of the third exemplary embodiment will be described below. That is, when the image forming apparatus 101 transitions from the power state A to the power state B, the image forming apparatus 101 causes the sub-core (second core 346) to transition to the suspended state and checks whether the device driver for the USB host is used. Then, in a case where the device driver for the USB host is not used, the device driver is unloaded to thereby enable transition from the power state B to the power state C. During transition from the power state B to the power state C, the first core 345 is caused to transition to the suspended state and the device driver is not loaded.

Further, during transition from the power state C to the power state B, the first core 345 is restored to the operation state and the device driver for the USB host is not loaded. During transition from the power state B to the power state A, the sub-core (second core 346) is restored to the operation state and the device driver for the USB host is loaded.

On the other hand, when the device driver for the USB host is used, the image forming apparatus 101 executes the system job for the USB host and disables transition from the power state B to the power state C. Accordingly, the first core 345 is not brought into the suspended state.

An example of the combination of the configuration of the second exemplary embodiment and the configuration of the third exemplary embodiment will be described below. That is, during transition from the power state A to the power state B, the image forming apparatus 101 unloads the device driver for the image processing circuit 227 and checks whether the device driver for the USB host is used. Then, in a case where the device driver for the USB host is not used, the image forming apparatus 101 unloads the device driver for the USB host and enables transition from the power state B to the power state C. During transition from the power state B to the power state C and during transition from the power state C to the power state B, the device driver for the image processing circuit 227 and the device driver for the USB host are not loaded.

On the other hand, in a case where the device driver for the USB host is used, the image forming apparatus 101 executes the system job for the USB host and disables transition from the power state B to the power state C.

An example of the combination of the configuration of the first exemplary embodiment, the configuration of the second exemplary embodiment, and the configuration of the third exemplary embodiment will be described below. That is, during transition from the power state A to the power state B, the image forming apparatus 101 causes the sub-core (second core 346) to transition to the suspended state, unloads the device driver for the image processing circuit 227, and checks whether the device driver for the USB host is used. Then, in a case where the device driver for the USB host is not used, the image forming apparatus 101 unloads the device driver for the USB host and enables transition from the power state B to the power state C. During transition from the power state B to the power state C, the first core 345 is caused to transition to the suspended state and the device driver for the USB host and the device driver for the image processing circuit 227 are not loaded.

Further, during transition from the power state C to the power state B, the first core 345 is restored to the operation state and the device driver for the image processing circuit 227 and the device driver for the USB host are not loaded. During transition from the power state B to the power state A, the sub-core (second core 346) is restored to the operation state and the device driver for the image processing circuit 227 and the device driver for the USB host are loaded.

On the other hand, in a case where the device driver for the USB host is used, the image forming apparatus 101 executes the system job for the USB host and disables transition from the power state B to the power state C. Accordingly, the first core 345 is not brought into the suspended state.

Beneficial effects of the exemplary embodiments described above can be obtained by any combination of the configurations according to the exemplary embodiments.

Various examples and exemplary embodiments of the disclosure have been described above. However, the spirit and scope of the disclosure are not limited to specific descriptions herein.

The disclosure can also be implemented by processing in which a program for implementing one or more functions according to the above-described exemplary embodiments is supplied to a system or an apparatus via a network or a storage medium, and one or more processors of the system or the apparatus read the program and execute the program. The disclosure can also be implemented by a circuit (e.g., an application specific integrated circuit (ASIC)) that implements one or more functions according to the exemplary embodiments described above.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-120581, filed Jun. 27, 2019, which is hereby incorporated by reference herein in its entirety.

What is claimed is:

1. An apparatus comprising:
a processor including a plurality of cores,
wherein the processor is configured to switch a power state between a first power state and a second power state, the first power state being a state where one of the plurality of cores is usable and the other cores are unusable, the second power state being a state where the plurality of cores are unusable,
wherein, based on reception of predetermined data in the second power state, the processor switches the power state from the second power state to the first power state, and when a first condition is met after switching to the first power state, the processor is configured to switch the power state from the first power state to the second power state.

2. The apparatus according to claim 1,
wherein the processor is configured to switch the power state to a third power state where the plurality of cores are usable, and
wherein, based on reception of a data different from the predetermined data in the second power state, the processor switches the power state from the second power state to the first power state, and based on the data different being a restoration factor of the apparatus, the processor switches the power state from the first power state to the third power state.

3. The apparatus according to claim 1, wherein the predetermined data is a packet signal to be received via a network.

4. The apparatus according to claim 1, further comprising a facsimile device,
wherein the predetermined data is a facsimile incoming call.

5. The apparatus according to claim 1, wherein the first condition is a lapse of a predetermined time period after execution of processing based on the predetermined data.

6. The apparatus according to claim 2,
wherein, when a second condition is met after switching to the third power state, the processor switches the power state to the second power state,
wherein the first condition is a lapse of a predetermined time period after execution of processing based on the predetermined data, and
wherein the second condition is a lapse of a predetermined time period after execution of processing based on the data different from the predetermined data.

7. The apparatus according to claim 1, further comprising:
a printer configured to print an image based on image data on a sheet; and
an image processing circuit configured to perform processing on the image data and output the image data to the printer,
wherein the processor prohibits power supply to the image processing circuit in the first power state.

8. The apparatus according to claim 7, wherein the processor prohibits power supply to the image processing circuit in the second power state.

9. The apparatus according to claim 1, further comprising:
a power control unit configured to control supply of power to the processor,
wherein the power control unit does not supply power to the other cores in the first power state, and
wherein the power control unit does not supply power to the plurality of cores in the second power state.

10. The apparatus according to claim 9, wherein, in a case where the predetermined data is received in the second power state, the processor causes the power control unit to supply power to the one of the plurality of cores, and the one of the plurality of cores of the processor becomes usable.

11. The apparatus according to claim 1, wherein the usable state is a state where the processor inputs a clock to a core, and the unusable state is a state where the processor inputs no clock to a core.

12. A method of an apparatus that includes a processor including a plurality of cores, the method comprising:
   switching a power state between a first power state and a second power state, the first power state being a state where one of the plurality of cores is usable and the other cores are unusable, the second power state being a state where the plurality of cores are unusable; and
   switching, based on reception of predetermined data in the second power state, the power state from the second power state to the first power state, and when a first condition is met after switching to the first power state, switching the power state from the first power state to the second power state.

13. The method according to claim 12, wherein the predetermined data is a packet signal to be received via a network.

14. The method according to claim 12, wherein the first condition is a lapse of a predetermined time period after execution of processing based on the predetermined data.

15. The method according to claim 12 further comprising:
   controlling supply of power to the processor;
   wherein the controlling includes not supplying power to the other cores in the first power state, and
   not supplying power to the plurality of cores in the second power state.

16. The method according to claim 12, wherein the predetermined data is a facsimile incoming call.

17. The method according to claim 12, further comprising:
   switching the power state to a third power state where the plurality of cores are usable;
   switching the power state from the second power state to the first power state based on reception of the predetermined data in the second power state; and
   switching the power state from the first power state to the third power state based on reception of data different from the predetermined data in the first power state.

18. The method according to claim 17, further comprising:
   switching the power state to the second power state when a second condition is met after switching to the third power state,
   wherein the first condition is a lapse of a predetermined time period after execution of processing based on the predetermined data, and
   wherein the second condition is a lapse of a predetermined time period after execution of processing based on the data different from the predetermined data.

19. The method according to claim 12, further comprising:
   printing an image based on image data on a sheet; and
   performing processing on the image data and outputting the image data to a printer.

20. The method according to claim 12, wherein the usable state is a state where a clock is input to a core, and the unusable state is a state where no clock is input to a core.

21. An apparatus comprising:
   a processor including at least a first core and a second core;
   wherein the processor is switchable between a first state, a second state, and a third state, the first state is a state in which the first core is usable and the second core is unusable, the second state is a state in which the first core and the second core are unusable, and the third state is a state in which at least the first core and the second core are usable, and
   wherein, based on reception of a data in the second state, the processor turns into the first state from the second state, and, when a condition is met after turning into the first state, the processor turns into the third state from the first state.

22. The apparatus according to claim 21, wherein the condition is that the data is a restoration factor of the apparatus.

23. The apparatus according to claim 21, wherein the data is a packet signal to be received via a network.

24. The apparatus according to claim 21, further comprising a facsimile device, wherein the data is a facsimile incoming call.

25. The apparatus according to claim 21, further comprising:
   a printer configured to print an image based on image data on a sheet; and
   an image processing circuit configured to perform processing on the image data and output the image data to the printer,
   wherein the processor prohibits power supply to the image processing circuit in the first state.

26. The apparatus according to claim 25, wherein the processor prohibits power supply to the image processing circuit in the second state.

* * * * *